(12) United States Patent
Herdagdelen et al.

(10) Patent No.: US 9,355,091 B2
(45) Date of Patent: May 31, 2016

(54) SYSTEMS AND METHODS FOR LANGUAGE CLASSIFICATION

(71) Applicant: Crimson Hexagon, Inc., Boston, MA (US)

(72) Inventors: Amac Herdagdelen, Mountain View, CA (US); Aykut Firat, Cambridge, MA (US); Christopher Bingham, Cambridge, MA (US)

(73) Assignee: Crimson Hexagon, Inc., Boston, MA (US)

( * ) Notice: Subject to any disclaimer, the term of this patent is extended or adjusted under 35 U.S.C. 154(b) by 316 days.

(21) Appl. No.: 13/798,890

(22) Filed: Mar. 13, 2013

(65) Prior Publication Data

US 2014/0278353 A1   Sep. 18, 2014

(51) Int. Cl.
*G06F 17/28* (2006.01)
(52) U.S. Cl.
CPC ...................................... *G06F 17/28* (2013.01)
(58) Field of Classification Search
None
See application file for complete search history.

(56) References Cited

U.S. PATENT DOCUMENTS

| | | | |
|---|---|---|---|
| 8,606,575 B1 * | 12/2013 | Witt-ehsani | 704/235 |
| 2002/0022956 A1 * | 2/2002 | Ukrainczyk et al. | 704/9 |
| 2009/0198487 A1 * | 8/2009 | Wong et al. | 704/4 |

OTHER PUBLICATIONS

McCallum et al., A comparison of event models for naïve bayes text classification. Proc. of AAAI-98 Workshop on Learning for Text Categorization. 1998, 8 pages.

* cited by examiner

*Primary Examiner* — Jeremiah Bryar
(74) *Attorney, Agent, or Firm* — Nutter McClennen & Fish LLP

(57) ABSTRACT

Systems and methods are provided for classifying text based on language using one or more computer servers and storage devices. In general, the systems and methods can include a language classification module for classifying text of an input data set using the output of a training module. In an exemplary embodiment, a bootstrapping step feeds the output of the language classification module back into the training module to increase the accuracy of the language classification module. By iterating the language classification and training modules with input data having certain features, a user can tailor the language classification module for use with text having those or similar features.

20 Claims, 6 Drawing Sheets

| | English | Spanish | Portuguese |
|---|---|---|---|
| Tes | 1 | 0 | 0 |
| est | 1 | 0 | 0 |
| st_ | 1 | 0 | 0 |
| t_D | 1 | 0 | 0 |
| _Da | 1 | 0 | 0 |
| Dat | 1 | 0 | 0 |
| ata | 1 | 0 | 0 |

17

SYSTEMS AND METHODS FOR LANGUAGE CLASSIFICATION

FIELD

Exemplary embodiments of the present invention relate to classification of text according to language.

BACKGROUND

Efforts to extract meaning from source data—including documents and files containing text, audio, video, and other communications media—by classifying them into given categories, have a long history. Increases in the amount of digital content, such as web pages, blogs, emails, digitized books and articles, electronic versions of formal government reports and legislative hearings and records, and especially social media such as Twitter, Facebook, and LinkedIn posts, give rise to computation challenges for those who desire to mine such voluminous information sources for useful meaning.

Particularly as the territorial reach of the Internet expands, one obstacle to obtaining value from digital content containing text is language classification. Categorization of text according to language is a prerequisite to any meaningful computational analysis of its content. Moreover, language classification can serve as a filter for information from a particular demographic.

Existing language classification techniques have several drawbacks. Some language classifiers adapted for use with digital content simply use information associated with an author profile, for example the author's location or primary language, as a proxy for the language in which that author has written. Of course, this approach is subject to error as the author may write in more than one language, none of which may be related to the author's profile information.

More sophisticated language classification techniques use statistical association algorithms that categorize text based on the probability that certain features of the text, e.g., character combinations, will occur in a given language. However, such algorithms require a large amount of human-generated training data for each language supported by the algorithm, particularly where the data to be categorized only includes small amounts of text, e.g., posts on social media websites such as Twitter.

Many commercially available products using the aforementioned statistical association algorithms suffer from the additional drawback that they are not customizable. The algorithms are often trained using a standardized set of training data, such as news articles or Wikipedia pages, which may not include features present in the data to be categorized. Social media posts, for example, often contain jargon unique to a given social media website that might not be encompassed in the training data. In addition, it may be difficult to add or remove languages from the training data based on the user's needs. Accordingly, there remains a need for improved language classifiers.

SUMMARY

The present invention generally provides systems and methods for classifying text according to language. In one aspect, a method is provided for classifying text according to language using one or more computer processors. The method can include accessing by a training module a training data set from a training data set database having a plurality of text strings, each text string being associated with a tag that indicates a language in which the text string is written. The training module can include a training computer processor coupled to a memory having instructions that can cause the training computer processor to perform the accessing. The method can also include using the training module to statistically associate one or more features of each of a plurality of text strings of the training data set with a language in which the text string is written and store statistical association data in a statistical association database. The method can also include receiving an input data set having one or more text strings by a classification module. The classification module can include a classifying computer processor coupled to a memory including instructions that can cause the classifying computer processor to classify one or more of the text strings according to a language in which the text string is written, tag the classified text strings with a tag that indicates the language, and output the tagged text strings. The method can also include receiving by the training module the tagged text strings, statistically associating the tagged text strings with the tagged language, and updating the statistical association data in the statistical association database.

The steps of receiving, classifying, and tagging the text strings of the input data set and then receiving and statistically associating the tagged text strings and updating the statistical association data can be repeated one or more times. A user can specify one or more languages for classifying the input data set in the classifying step.

In another aspect, a computer system is provided for classifying text according to language. The computer system can include a training module that can include a training computer processor coupled to a memory having instructions that can cause the processor to receive a training data set from a training data set database having one or more text strings tagged with a tag that indicates a language in which the text string is written, statistically associate one or more features of each of the text strings of the training data set with its tagged language, and store statistical association data in a statistical association database. The computer system can further include a classification module that can include a classifying computer processor coupled to a memory having instructions that can cause the processor to receive an input data set having one or more text strings, classify the one or more text strings according to a language in which the text is written, tag the classified text strings with a tag that indicates the language, and output the tagged text strings. The training module can be configured to receive the tagged text strings output by the classifying computer processor as the training data set.

For both the method and the computer system described above, the training data set and/or the input data set can include one or more text strings from a social media website. The training data set and the input data set can both include one or more text strings from at least one common source. The statistical association data can describe an incidence of one or more features of the text strings of the training data set in one or more languages, and the classification module can classify the text strings of the input data set by computing probabilities that each of the text strings was written in each of the one or more languages.

In another aspect, a non-transitory computer-readable storage medium can contain instructions for classifying text according to language. The instructions can cause one or more computer processors to access a training data set database having a plurality of text strings, each text string being associated with a tag that indicates a language in which the text string is written. The instructions can also cause the one or more computer processors to statistically associate one or more features of each of the text strings of a training data set with its tagged language and store statistical association data in a statistical association database. The instructions can also cause the one or more computer processors to receive an input data set having one or more text strings, classify one or more of the text strings according to a language in which the text string is written, tag the classified text strings with a tag that indicates the language, and output the tagged text strings. The instructions can also cause the one or more computer processors to receive the tagged text strings, statistically associate the tagged text strings with the tagged language, and update the statistical association data in the statistical association database. The instructions can cause the one or more computer processors to repeat the steps of receiving, classifying, and tagging text strings of the input data set and then receiving and statistically associating the tagged text strings and updating the statistical association data one or more times.

The present invention further provides devices, systems, and methods as claimed.

DETAILED DESCRIPTION OF THE INVENTION

Systems and methods are provided for classifying text based on language using one or more computer servers and storage devices. In general, the systems and methods can include a classification module for classifying text of an input data set using the output of a training module. In an exemplary embodiment, a bootstrapping step feeds the output of the classification module back into the training module to increase the accuracy of the language classification module. By iterating the classification and training modules with input data having certain features, a user can tailor the classification module for use with text having those or similar features.

Certain exemplary embodiments will now be described to provide an overall understanding of the principles of the structure, function, manufacture, and use of the methods, systems, and devices disclosed herein. One or more examples of these embodiments are illustrated in the accompanying drawings. Those skilled in the art will understand that the methods, systems, and devices specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Computer Processor

Figure 1:
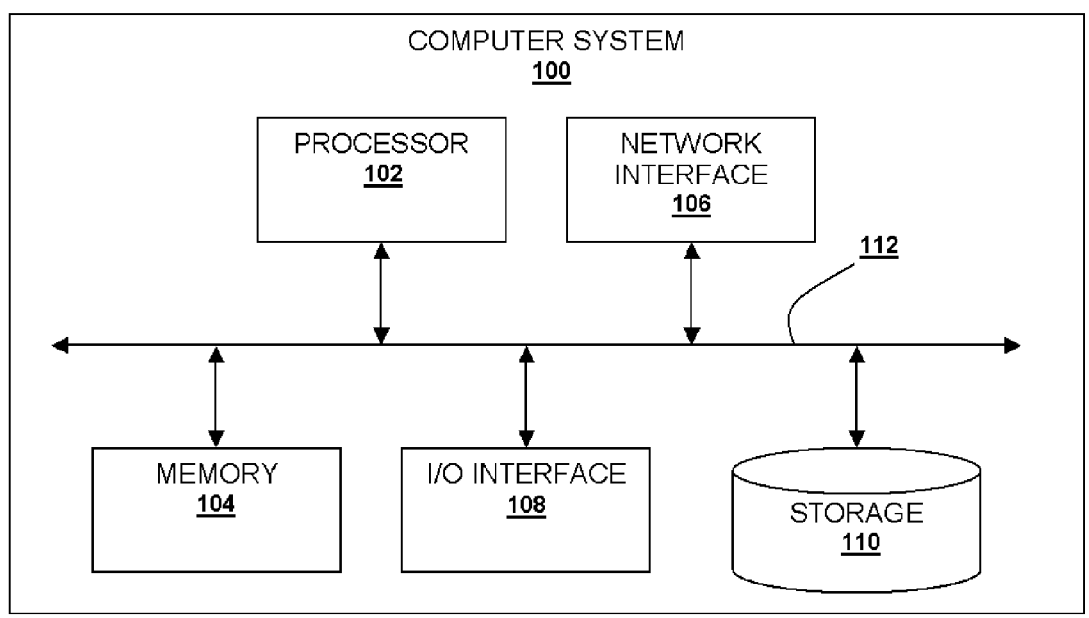
FIG. 1 is a schematic diagram of one exemplary embodiment of a computer system.

The systems and methods disclosed herein can be implemented using one or more computer systems, such as the exemplary embodiment of a computer system 100 shown in FIG. 1. As shown, the computer system 100 can include one or more processors 102 which can control the operation of the computer system 100. The processor(s) 102 can include any type of microprocessor or central processing unit (CPU), including programmable general-purpose or special-purpose microprocessors and/or any one of a variety of proprietary or commercially available single or multi-processor systems. The computer system 100 can also include one or more memories 104, which can provide temporary storage for code to be executed by the processor(s) 102 or for data acquired from one or more users, storage devices, and/or databases. The memory 104 can include read-only memory (ROM), flash memory, one or more varieties of random access memory (RAM) (e.g., static RAM (SRAM), dynamic RAM (DRAM), or synchronous DRAM (SDRAM)), and/or a combination of memory technologies.

The various elements of the computer system 100 can be coupled to a bus system 112. The illustrated bus system 112 is an abstraction that represents any one or more separate physical busses, communication lines/interfaces, and/or multi-drop or point-to-point connections, connected by appropriate bridges, adapters, and/or controllers. The computer system 100 can also include one or more network interface(s) 106, one or more input/output (IO) interface(s) 108, and one or more storage device(s) 110.

The network interface(s) 106 can enable the computer system 100 to communicate with remote devices (e.g., other computer systems) over a network, and can be, for example, remote desktop connection interfaces, Ethernet adapters, and/or other local area network (LAN) adapters. The IO interface(s) 108 can include one or more interface components to connect the computer system 100 with other electronic equipment. For example, the IO interface(s) 108 can include high speed data ports, such as USB ports, 1394 ports, etc. Additionally, the computer system 100 can be accessible to a human user, and thus the IO interface(s) 108 can include displays, speakers, keyboards, pointing devices, and/or various other video, audio, or alphanumeric interfaces. The storage device(s) 110 can include any conventional medium for storing data in a non-volatile and/or non-transient manner. The storage device(s) 110 can thus hold data and/or instructions in a persistent state (i.e., the value is retained despite interruption of power to the computer system 100). The storage device(s) 110 can include one or more hard disk drives, flash drives, USB drives, optical drives, various media cards, and/or any combination thereof and can be directly connected to the computer system 100 or remotely connected thereto, such as over a network. The elements illustrated in FIG. 1 can be some or all of the elements of a single physical machine. In addition, not all of the illustrated elements need to be located on or in the same physical or logical machine. Rather, the illustrated elements can be distributed in nature, e.g., using a server farm or cloud-based technology. Exemplary computer systems include conventional desktop computers, workstations, minicomputers, laptop computers, tablet computers, PDAs, mobile phones, and the like.

Although an exemplary computer system is depicted and described herein, it will be appreciated that this is for sake of generality and convenience. In other embodiments, the computer system may differ in architecture and operation from that shown and described here.

Modules

The various functions performed by the computer system 100 can be logically described as being performed by one or more modules. It will be appreciated that such modules can be implemented in hardware, software, or a combination thereof. It will further be appreciated that, when implemented in software, modules can be part of a single program or one or more separate programs, and can be implemented in a variety of contexts (e.g., as part of an operating system, a device driver, a standalone application, and/or combinations thereof). In addition, software embodying one or more modules is not a signal and can be stored as an executable program on one or more non-transitory computer-readable storage mediums. Functions disclosed herein as being performed by a particular module can also be performed by any other module or combination of modules.

Figure 2:
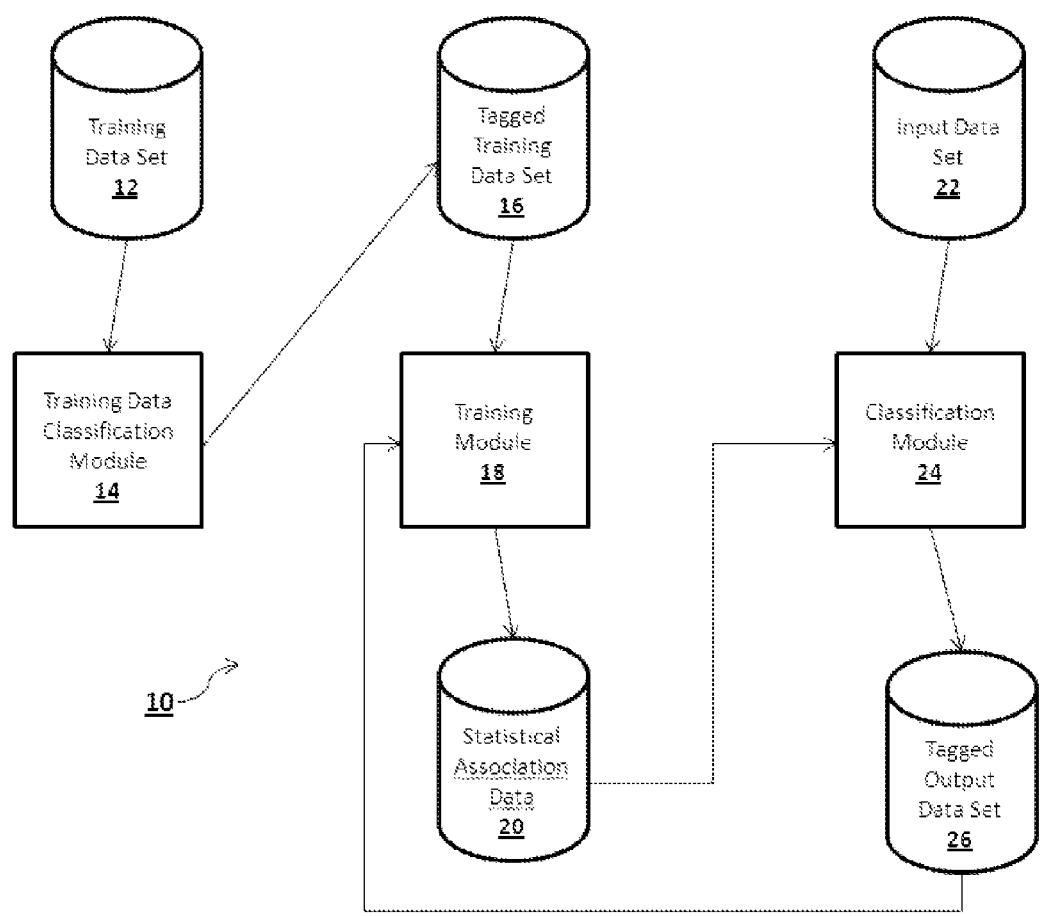
FIG. 2 is a schematic diagram of one exemplary embodiment of a language classifier system.

An exemplary system 10 for carrying out the invention is disclosed in FIG. 2, and can operate as follows: A training data classification module 14 presents one or more human users with a text string from a training data set 12 and receives from the one or more human users a language classification for the text string. The text string can then be "tagged" with the language and added to the tagged training data set 16. Using the tagged training data 16, a training module 18 creates statistical association data 20 between features of the tagged data 16 and the language with which the data 16 is tagged. An input data set 22 can then be fed into a classification module 24, which uses the statistical association data 20 to tag each text item of the input data set 22 according to language, based on the probability that each text item of the input data set 22 was written in one or more languages. To enhance the accuracy of the classification module 24, the tagged output data 26 is then "bootstrapped" back into the training module 18 to create additional statistical association data 20 between the tagged output data 26 and the one or more languages. The training module 18 and classification module 24 can then be repeated any number times with a new input data set 22, with each iteration increasing the accuracy of the classification module 24, particularly the accuracy of the classification module 24 for the type of input data 22 used in that iteration.

The system 10 can include fewer or more modules than what is shown and described herein and can be implemented using one or more digital data processing systems of the type described above. The system 10 can thus be implemented on a single computer system, or can be distributed across a plurality of computer systems, e.g., across a "cloud." The system 10 also includes a plurality of databases, which can be stored on and accessed by computer systems. It will be appreciated that any of the modules or databases disclosed herein can be subdivided or can be combined with other modules or databases.

Training Module

Figure 3:
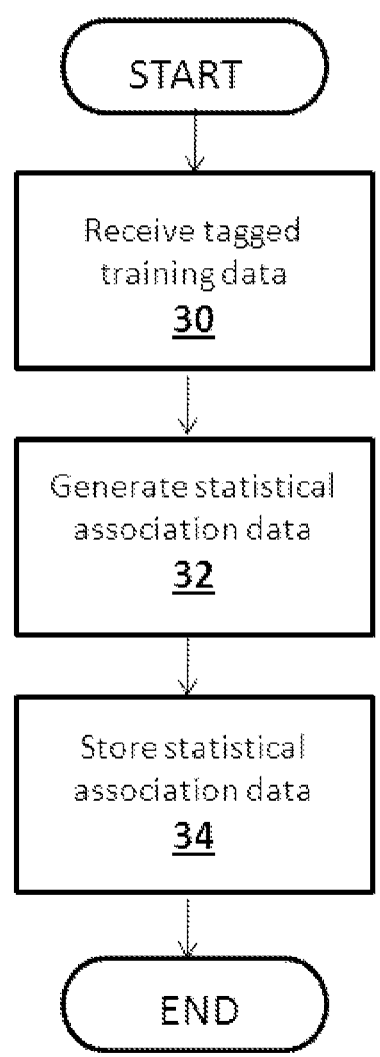
FIG. 3 is a flowchart that schematically depicts an exemplary method of a training module for use with the language classifier system of FIG. 2.

One exemplary embodiment of the training module 18 can be configured to generate statistical association data 20 between certain features of the tagged training data set 16 and language. The training module 18 can include a training computer processor and a memory coupled to the training computer processor. The memory can contain instructions causing the training computer processor to perform the steps outlined in FIG. 3, although it will be appreciated that any number of steps can be added to or removed from the exemplary method performed by the training module 18. Moreover, it should be noted that any ordering of method steps implied by such flowcharts or the description thereof is not to be construed as limiting the method to performing the steps in that order. Rather, the various steps of each of the methods disclosed herein can be performed in a variety of sequences.

First, the training computer processor can receive 30 the tagged training data 16 from a training data database. The tagged training data 16 can include a plurality of text strings of any length that have been obtained from any one or more sources, e.g., social media websites, blogs, etc. Each of the text strings of the tagged training data set 16 can be associated with a tag that indicates a language in which the text string is written. In an exemplary embodiment, the tags associated with each text string of the tagged training data set 16 have been generated by one or more human users.

Figures 4, 5:
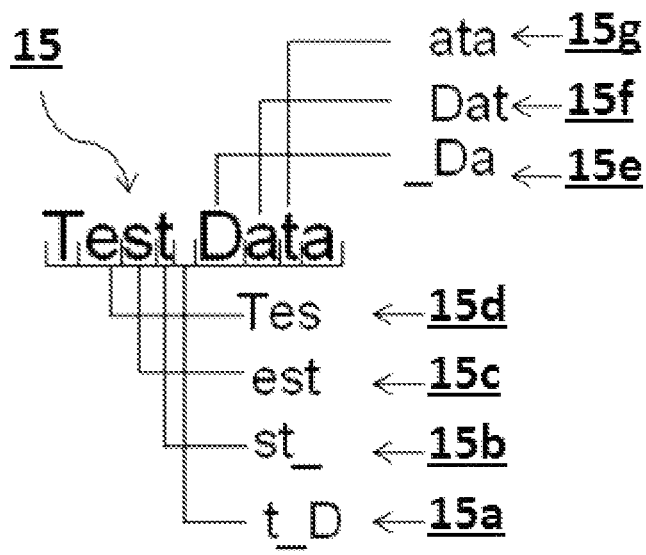
FIG. 4 is a schematic diagram of one exemplary step of the method of FIG. 3.
FIG. 5 is a schematic diagram of one exemplary embodiment of a statistical association data set generated by the method of FIG. 3.

Given the tagged training data 16, the training computer processor can generate 32 statistical association data 20 between certain features of the tagged training data 16 and language according to the one or more training algorithms. One exemplary training algorithm creates statistical association data 20 between one or more consecutive characters of a text string and the language in which the text string is written. FIG. 4 illustrates an application of the exemplary training algorithm to an exemplary text string 15 that is associated with a tag indicating that it is written in English. First, the text string 15 can be broken down into character permutations 15a, 15b, 15c, 15d, 15e, 15f, 15g of more than one consecutive character. The character permutations can include, e.g., letters, numbers, punctuation marks, and may or may not be case sensitive. The training algorithm can extract all possible character permutations within the text string 15, or only some of the character permutations within the text string 15. Although the text string 15 is broken down into triplets in the example of FIG. 4, the character permutations 15a, 15b, 15c, 15d, 15e, 15f, 15g can consist of any number of consecutive characters. Because the tag associated with the text string 15 indicates that the text string 15 is written in English, each character permutation 15a, 15b, 15c, 15d, 15e, 15f, 15g can be assigned a "point" value for English.

Applying this exemplary training algorithm to each text string of the training data set 12, the training module 18 can generate 32 statistical association data 20 between character permutations of the tagged training data 16 and the one or more languages. The statistical association data 20 can then be stored 34 in a statistical association database, and can be, e.g., in the form of a matrix 17 of the character permutations 15a, 15b, 15c, 15d, 15e, 15f, 15g and corresponding point values reflecting an incidence of each of the character permutations 15a, 15b, 15c, 15d, 15e, 15f, 15g in each of the one or more languages. FIG. 5 depicts the exemplary matrix 17 that could have been generated based on the exemplary text string 15 of FIG. 4 and stored in the statistical association database. Different types of statistical association data 20 can be generated for different types of training algorithms, however. By way of non-limiting example, the statistical association data 20 can associate average word length, grammatical structure, use of certain letters or punctuation marks, etc., with language.

Classification Module

Figure 6:
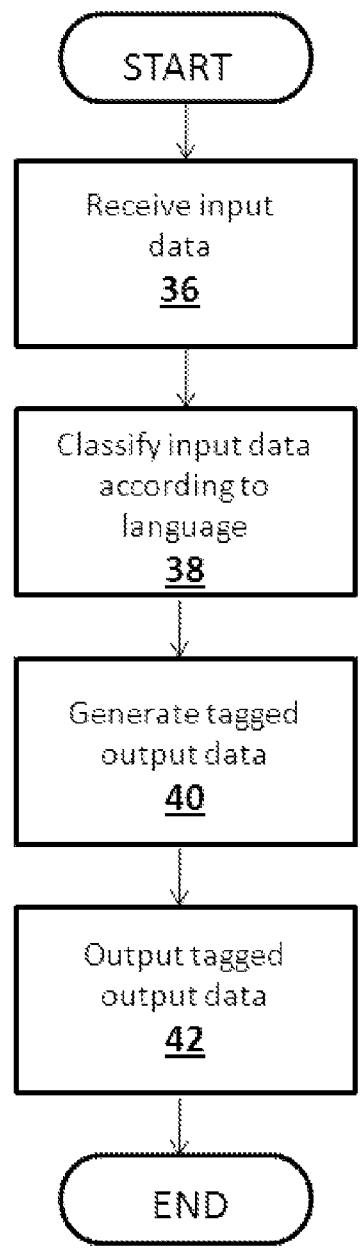
FIG. 6 is a flowchart that schematically depicts an exemplary method of a classification module for use with the language classifier system of FIG. 2.

Using the statistical association data 20 generated 32 by the training module 18, the exemplary classification module 34 can classify text of the input data set 22 according to language. The classification module 34 can include a classifying computer processor and a memory coupled to the classifying computer processor. The memory can contain instructions that cause the classifying computer processor to perform the various steps outlined in FIG. 6, although it will be appreciated that any number of steps can be added to or removed from the exemplary method performed by the classification module 34.

First, the classifying computer processor can receive 36 the input data set 22. Like the training data set 12, the input data set 22 can include one or more text strings of any length and can be obtained from a variety of sources, either the same or different from the sources used to generate the training data set 12. In an exemplary embodiment, however, the input data set 22 is generated from at least one source that was used to generate the training data set 12. In general, the input data set 22 is supplied by the end user. The classifying computer processor can prompt the end user for input regarding the source or sources of the input data 22, and the classifying computer processor can then retrieve the input data 22 from one or more databases containing data from the requested sources. The source or sources can be selected by the end user according to various constraints, e.g., website, time range, author profile information, etc. In another aspect, the end user can input the input data set 22 directly into the classification module 34.

The classifying computer processor can then classify 38 the input data set 22 according to language using one or more language classification algorithms. Several probability-based algorithms have been applied to the problem of language classification, such as the Naive-Bayes method, described in A. McCallum and K. Nigam, "A Comparison of Event Models for Naive Bayes Text Classification," Proc. of AAAI-98 Workshop on Learning for Text Categorization (1998). The Naive-Bayes method and similar methods classify text by calculating a probability that the text was written in a particular language, based on statistical association data between certain features of text and language. According to an exemplary embodiment of the classification module 34, a language classification algorithm classifies the input data set 22 according to language based on probabilities computed using the statistical association data 20.

An exemplary embodiment of a classification algorithm that can be used in step 38 can operate as follows: First, the classification algorithm extracts character permutations from a text string of the input data set 22, similarly to the process exemplified in FIG. 4 and described above for the training module 18. The classification algorithm then searches the statistical association data set 20 for each of the character permutations derived from the text string of the input data set 22. If a character permutation can be found in the statistical association data set 20, then the text string will be assigned the corresponding point value, or point values, of that character permutation for the language, or languages, with which the character permutation is associated. For example, given the statistical association data matrix 17 of FIG. 5, if the character permutation 15c is extracted from the text string of the input data set 22, the text string will be assigned 1 point for English and 0 points for both Spanish and Portuguese. The search and point assignment process is repeated for each character permutation extracted from the text string, and all of the points for each language are added to yield a total point value for each of the one or more languages. Based on the total point values for each of the one or more languages, the classification algorithm computes a probability that the text string was written in each of the one or more languages. The text string is then classified as being written in the language for which the text string has the highest computed probability, and the classification algorithm is repeated for the remaining text strings of the input data set 22.

Having classified 38 the input data set 22 according to language, the classifying computer processor can associate each text string of the input data set 22 with a tag indicating a language in which the text string was written to generate 40 the tagged output data set 26. The tagged output data set 26 from the classification module 34 can be output 42 in any format. In one exemplary embodiment, the tagged output data 26 is organized into an easily readable format, e.g., a chart, a graph, etc., and output 42 to a display monitor to be viewable by the end user. The tagged output data 26 can also be stored in one or more databases for further use.

The method performed by the classification module 34 can include one or more alternative steps for tagging text strings under certain circumstances, either automatically or at the option of the end user. By way of non-limiting example, if a probability that a text string was written in all of the one or more languages is zero, then the text string may simply be discarded before the classification module 34 reaches step 40. If probabilities that a text string was written in more than one of the one or more languages are within a pre-specified range of each other, e.g., within 5%, then the text string may similarly be discarded before the classification module 34 reaches step 40.

The classification module 34 can include various options to allow for customization by the end user. In one aspect, the end user can select the one or more languages for classification using the classification module 34. Other non-limiting examples of options for the end user include selecting the one or more classification algorithms to be used for classifying 38 the input data 22 according to language, selecting a format and/or a destination for outputting 42 the tagged output data 26, etc. For all of the aforementioned examples, the classification module 34 can have default selections in the absence of input by the end user.

Bootstrapping Step

The training module 18 and the classification module 34 described above can produce inaccurate results where features of the input data set 22 are not encompassed in the statistical association data set 20 generated from the training data set 12. This problem can be alleviated by increasing a size of the training data set 12, but increasing the size of the training data set 12 can require additional input by human users to tag the training data set 12 according to language, which can be time-consuming and costly. Moreover, when the training data 12 is generated from one or more sources that are different from one or more sources used to generate the input data set 22, the training data 12 may not contain the same features as the input data set 22, regardless of the size of the training data set 12. A likelihood that a feature, e.g., a character permutation, will not be encompassed within the statistical association data set 20 can be particularly high where the one or more sources for the input data set 22 includes a social media website. Text strings obtained from social media websites, e.g., posts, "tweets," etc., can often be short and can contain jargon unique to a particular social media website. For example, an exemplary Twitter post can contain only two words, both of which may be abbreviations or jargon that are unique to Twitter posts. The accuracy of the classification module 34 therefore relies on the statistical association data set 20 encompassing the two words contained in the Twitter post, or close variations thereof.

Figure 7:
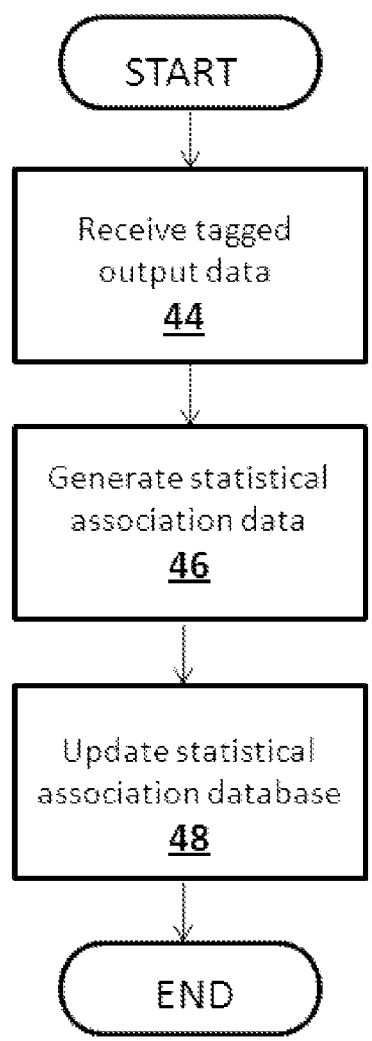
FIG. 7 is a flowchart that schematically depicts an exemplary method of a bootstrapping step for use with the language classifier system of FIG. 2.

To increase a likelihood that features of the input data set 22 are contained within the statistical association data set 20, the tagged output data 26 of the classification module 34 can be "bootstrapped" back into the training module 18 according to an exemplary bootstrapping step 50, illustrated in FIG. 7. Instructions contained in a memory coupled to a training computer processor can cause the training computer processor to receive 44 the tagged output data 26. The training computer processor can then generate 46 statistical association data 20 between certain features of the tagged output data 26 and language using one or more training algorithms, such as the training algorithm described above. The resulting statistical association data 20 can then be added to the statistical association database to update 48 the statistical association database, which can already contain statistical association data 20 from previous iterations of the training module 18. The bootstrapping step 50 can be repeated any number of times, thus serving the dual purpose of increasing the size of the statistical association database and customizing the classification module 24 for use with input data 22 having certain features.

One drawback to existing bootstrapping methods is the potential for error propagation. In the present example, a text string that is incorrectly classified by the classification module 24 can be fed back into the training module 18 to produce incorrect statistical association data 20. However, the impact of such errors is unlikely to noticeably reduce an accuracy of the classification module 24 due to the training and classifying computer processors' capacity to process large amounts of data. Using as an example the training and classification algorithms described above, improper distribution of one point to certain character permutations will have a minimal impact on the probability calculations of the classification algorithm where each character permutation has a large number of points. Because a volume of data within the tagged training data set 16 and the tagged output data set 26 is limited only by the capacity of the computer processors and storage devices employed, the amount of statistical association data 20 generated by the training module 18 can be increased significantly and efficiently, particularly where cloud-based technology and/or multiple computer processors are used.

Under certain circumstances, one or more of the text strings of the tagged output data set 26 may not be fed back into the training module 18, particularly where there is a high likelihood that the one or more text strings were tagged incorrectly. By way of non-limiting example, where a probability that a text string was written in any of the one or more languages is zero, and/or where probabilities that the text string was written in more than one language are within a pre-specified range of each other, e.g., within 5%, then the text string may not be fed back into the training module 18. Such data may not represent good training data, and thus may not undergo the bootstrapping step 50 either automatically or at the option of a user. In another aspect, the tagged output data set 26 may not be bootstrapped back into the training module 18 where a size of the statistical association data set 20 has reached a predetermined limit. It will be understood by a person skilled in the art that such modifications to the bootstrapping step 50 are not necessary, however.

What is claimed is:

1. A method for classifying text according to language using one or more computer processors, comprising:
   i) extracting one or more permutations of consecutive characters from each of a plurality of training text strings included in a training data set, statistically associating the extracted one or more permutations of consecutive characters of each training text string with a language in which the training text string is written, using a training module that comprises a training computer processor coupled to a memory having instructions causing the training computer processor to store statistical association data in a statistical association database;
   ii) receiving an input data set having one or more input text strings, by a classification module that comprises a classifying computer processor coupled to a memory including instructions causing the classifying computer processor to extract one or more permutations of consecutive characters from each of the input text strings and classify each input text string according to a language in which the input text string is written by comparing the consecutive character permutations extracted from the input text string with the statistical association data, tag each classified input text string with a tag that indicates its language, and output the tagged input text string; and
   iii) receiving, by the training module, the tagged input text strings, statistically associating the input tagged text strings with the tagged language, and updating the statistical association data in the statistical association database.

2. The method of claim 1, wherein steps (ii) and (iii) are repeated one or more times.

3. The method of claim 1, wherein the method further comprises accessing by the training module the training data set from a training data set database, each text string being associated with a tag that indicates a language in which the text string is written.

4. The method of claim 1, wherein the training data set includes one or more text strings from a social media website.

5. The method of claim 1, wherein the input data set includes one or more text strings from a social media website.

6. The method of claim 1, wherein the training data set and the input data set both include one or more text strings from at least one common source.

7. The method of claim 6, wherein the statistical association data describes an incidence of one or more features of the text strings of the training data set in one or more languages.

8. The method of claim 7, wherein the classification module classifies the text strings of the input data set by computing probabilities that each of the text strings was written in each of the one or more languages.

9. The method of claim 1, wherein a user can specify one or more languages for classifying the input data set in step (iii).

10. A method for classifying text according to language using one or more computer processors, comprising:
   i) accessing, by a training module, a training data set from a training data set database having a plurality of text strings, each text string being associated with a tag that indicates a language in which the text string is written, the training module comprising a training computer processor coupled to a memory having instructions that cause the training computer processor to access the training data;
   ii) statistically associating, using the training module, one or more permutations of consecutive characters extracted from each of the text strings of the training data set with corresponding tagged language and storing statistical association data, associating the permutations with their corresponding language, in a statistical association database;
   iii) receiving an input data set having one or more input text strings by a classification module that comprises a classifying computer processor coupled to a memory including instructions that cause the classifying computer processor to extract one or more permutations of consecutive characters from each of the input text strings and classify each input text string according to a language in which the input text string is written by comparing the consecutive character permutations extracted from the input text string with the statistical association data, tag each classified input text string with a tag that indicates its language, and output the tagged input text string; and
   iv) receiving, by the training module the tagged input text strings, statistically associating the tagged input text strings with the tagged language, and updating the statistical association data in the statistical association database.

11. The method of claim 10, wherein steps (iii) and (iv) are repeated one or more times.

12. The method of claim 10, wherein the training data set is tagged by one or more human users.

13. A computer system for classifying text according to language, comprising:
- a training module that comprises a training computer processor coupled to a memory having instructions causing the processor to receive a training data set having one or more text strings tagged with a tag that indicates a language in which the text string is written, statistically associate one or more permutations of consecutive characters extracted from each of the text strings of the training data set with corresponding tagged language and storing statistical association data, associating the permutations with their corresponding language, in a statistical association database; and
- a classification module that comprises a classifying computer processor coupled to a memory having instructions causing the processor to receive an input data set having one or more input text strings, extract one or more permutations of consecutive characters from each of the input text strings, classify each input text string according to a language in which the input text is written by comparing the consecutive character permutations extracted from the input text string with the statistical association data, tag each classified input text string with a tag that indicates its language, and output the tagged input text string;
- wherein the training module can be configured to receive the tagged text strings output by the classifying computer processor as the training data set.

14. The system of claim 13, wherein the training data set includes one or more text strings from a social media website.

15. The system of claim 13, wherein the input data set includes one or more text strings from a social media website.

16. The system of claim 13, wherein the input data set and the training data set both include one or more text strings derived from at least one common source.

17. The system of claim 13, wherein the statistical association data describes an incidence of one or more features of the text strings of the training data in one or more languages.

18. The system of claim 17, wherein the classification module classifies the text strings of the input data set by computing probabilities that each of the text strings was written in each of the one or more languages.

19. A non-transitory computer-readable storage medium containing instructions for classifying text according to language, wherein the instructions cause one or more computer processors to:
  i) access a training data set from a training data set database having a plurality of text strings, each text string being associated with a tag that indicates a language in which the text string is written;
  ii) statistically associate one or more permutations of consecutive characters extracted from each of the text strings of the training data set with corresponding tagged language and storing statistical association data, associating the permutations with their corresponding language, in a statistical association database;
  iii) receive an input data set having one or more input text strings by a classification module that comprises a classifying computer processor coupled to a memory including instructions that cause the classifying computer processor to extract one or more permutations of consecutive characters from each of the input text strings and classify each input text string according to a language in which the input text string is written by comparing the consecutive character permutations extracted from the input text string with the statistical association data, tag each classified input text string with a tag that indicates its language, and output the tagged input text string; and
  iv) receive, by the training module the tagged input text strings, statistically associating the tagged input text strings with the tagged language, and updating the statistical association data in the statistical association database.

20. The storage medium of claim 19, wherein the instructions cause the one or more processors to repeat steps (iii) and (iv) one or more times.

* * * * *